United States Patent [19]
Baker

[11] 3,832,516
[45] Aug. 27, 1974

[54] WELDING APPARATUS AND WELDER HEAD

[75] Inventor: Harold R. Baker, Lynwood, Calif.

[73] Assignee: Norris Industries, Los Angeles, Calif.

[22] Filed: May 12, 1972

[21] Appl. No.: 252,657

Related U.S. Application Data

[60] Continuation-in-part of Ser. No. 63,992, July 23, 1970, , which is a division of Ser. No. 819,683, April 28, 1969.

[52] U.S. Cl. .................................. 219/81, 219/84
[51] Int. Cl. ............................................ B23k 11/06
[58] Field of Search ........... 219/81, 82, 83, 84, 117, 219/117 HD; 200/61.58, 61.42

[56] References Cited
UNITED STATES PATENTS

| | | | |
|---|---|---|---|
| 2,529,634 | 11/1950 | Sciaky | 219/84 |
| 2,730,600 | 1/1956 | Fisher et al. | 219/84 |
| 3,105,728 | 10/1963 | Seeloff | 219/84 X |

Primary Examiner—C. L. Albritton
Attorney, Agent, or Firm—Huebner & Worrel

[57] ABSTRACT

Electrical resistance welding apparatus suitable for securing an insertable spider in the annular rim of a wheel includes a plurality of circumferentially spaced apart opposed electrodes each for forming a seam weld made up of a series of overlapping welds. Each electrode set includes an inner and outer wheel type welder head. The inner head includes a conductive shaft having a conductive sleeve rotatably mounted thereon. The sleeve carries the inner wheel electrode and is also tiltably mounted on the shaft so that weld pressure upon the inner wheel electrode tilts the sleeve against the shaft. Thereby, the weld pressure maintains good electrical contact between the shaft and sleeve, even as the sleeve rotates, to prevent arcing therebetween.

14 Claims, 10 Drawing Figures

PATENTED AUG 27 1974 3,832,516

WELDING APPARATUS AND WELDER HEAD

This is a continuation in part of application Ser. No. 63,992, filed 23 July 1970 which application was a division of application Ser. No. 819,683, filed 28 Apr. 1969. Application Ser. No. 819,683 issued on 24 Aug. 1971 as U.S. Letters Pat. No. 3,601,450.

BACKGROUND AND SUMMARY OF THE INVENTION

Vehicle wheels generally are constructed of an annular rim which is rolled from flat stock into a desired cross section and approximate diameter, and the ends of the rim are welded, creating an endless, annular rim. Bridging the area defined by the rim is a spider or disc which is usually formed by a punch pressing operation. The spider is of a configuration which includes the usual wheel lug opening, hub cap retainers and center spindle receiving opening.

U.S. Pat. No. 3,601,450 points out disadvantages inherent with prior art techniques employed for fastening spiders in annular rims to form wheels and discloses and claims an improved vehicle wheel. The improved vehicle wheel is also disclosed herein and includes a rim and a spider formed of metal, the rim comprising an annular wall providing a base portion, the spider comprising a central plate section and peripherally, laterally extending flange means fitting in the base portion in surface-to-surface engagement, fastening means permanently joining said base portion and flange means, the fastening means including a plurality of circumferentially spaced seam welds, each of the seam welds including a series of overlapping individual low-heat pulse weld nuggets induced through electrical resistance, the parent metal of the base portion and the flange means adjacent the seam welds remaining substantially molecularly stable.

The present invention relates to an improved welding apparatus suitable for making the abovedescribed wheel. In making the improved wheel it is desirable to simultaneously form the plurality of circumferentially spaced seam welds which fasten the spider to the rim.

Accordingly, it is an object of the present invention to provide an improved electrical resistance welding apparatus capable of simultaneously forming a plurality of circumferentially spaced seam welds to fasten a spider to an annular wheel rim.

It is another object of the present invention to provide an improved electrical resistance type welding apparatus as set forth which is characterized by having a plurality of opposed electrode sets corresponding to the plurality of seam welds to be formed, each set of electrodes having an outer and inner wheel type welder head.

In constructing the abovementioned improved welding apparatus, difficulty was encountered with the inner welder heads. Due to the limited space available within the annular wheel rim, the maximum size of the wheel electrodes on the inner heads was severely restricted. As a consequence, wheel type welder heads of prior art design when sufficiently reduced in size to enable the fitting of a plurality of them within the annular wheel rim tended to arc between their rotatable and stationary portions. Arcing occurred since the density of current in the inner electrode wheels was higher than the current density in the outer electrode wheels for the reason that the inner electrode wheels due to the space limitation could not be made as large as the outer electrode wheels. The physical contact between the rotatable and stationary portions of the prior art heads was not sufficiently firm to conduct the high density currents carried by the smaller wheel electrodes. Accordingly, the prior art wheel type welder heads when of the reduced size necessary for fitting in the annular wheel rim tended to be burnt up by arcing and have short lives.

It is therefore an additional object of the present invention to provide an improved wheel type welder head capable of being constructed with relatively small sized wheel type electrodes characterized by being able to handle relatively high current densities without arcing. Such improved wheel type welder heads may form an integral part of the improved electrical resistance welding apparatus set forth above and also are particularly suitable for use in other welding operations and apparatus where the amount of space available is limited.

In accomplishing these and other objects, there is provided in accordance with the present invention electrical resistance welding apparatus for securing an insertable spider in the annular rim of a wheel. The apparatus includes a plurality of circumferentially spaced apart opposed electrode sets each for simultaneously forming a seam weld made up of a series of overlapping weld nuggets, thereby to fasten the spider to the wheel rim. Each electrode set includes an inner and outer wheel type welder head. Each inner head includes an electrically conductive shaft having a conductive sleeve rotatably mounted thereon. The sleeve carries the inner wheel electrode and is preferably tiltably mounted on the shaft end so that weld pressure upon the inner wheel electrode pivots the sleeve firmly against the shaft. Thereby, the weld pressure maintains good electrical contact between the shaft and sleeve, even as the sleeve rotates, so that high density current may be conducted from the sleeve to the shaft through the point of physical contact therebetween and arcing is prevented.

These and other objects and advantages will become apparent from the following description and drawings.

DETAILED DESCRIPTION OF THE PREFERRED EMBODIMENTS

This invention is directed to apparatus for forming overlapping seam weld fastening means, generally designated 10, for fastening together the parts of an annular workpiece in the form of a vehicle wheel designated 12, including an annular rim 14 and a spider or disc 16. Further, the invention is directed to the resistance seam welding apparatus, generally designated 18, employed for assembling the vehicle wheel 12.

In the manufacture of a vehicle wheel 12, it is customary to separately fabricate the annular rim 14 and spider or disc 16, and secure the two members together, creating the final vehicle wheel, which is adapted to receive a tire (not shown).

Figure 2:
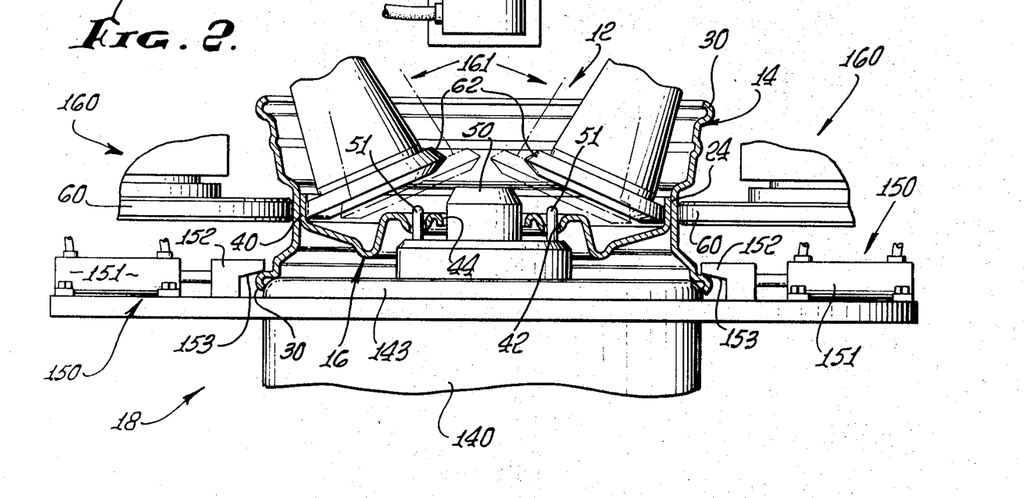
FIG. 2 is a cross sectional view taken on line 2—2 of FIG. 1.
Figure 3:
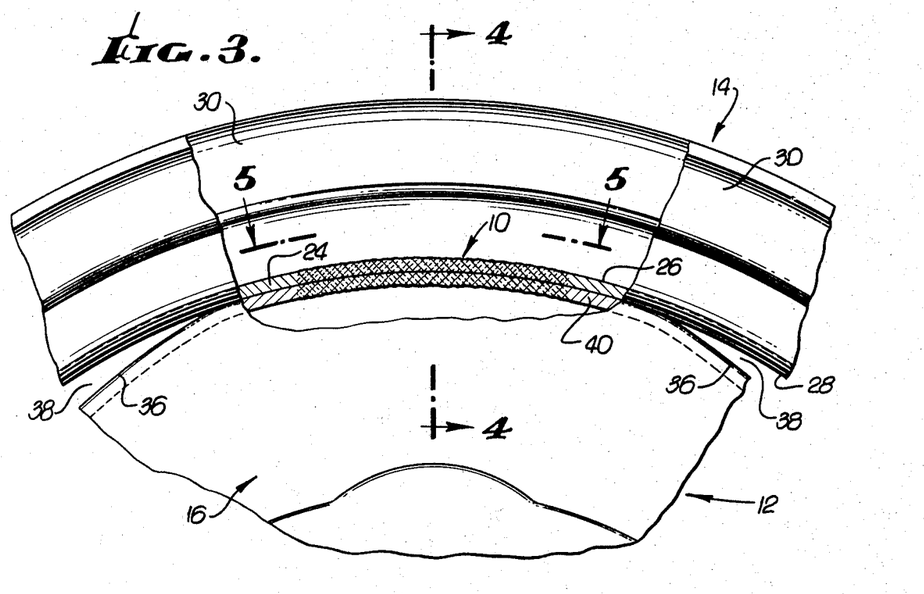
FIG. 3 is an enlarged fragmentary view of a vehicle wheel and one of the overlapping seam welds creating the fastening means.
Figure 4:
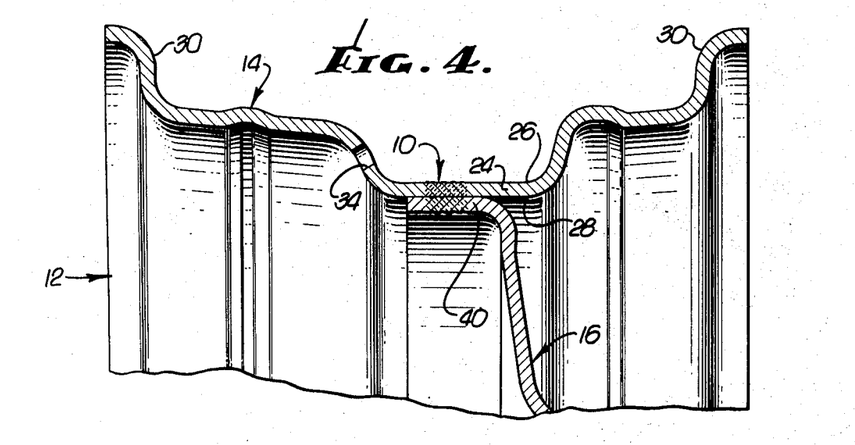
FIG. 4 is a cross sectional view of a vehicle wheel taken on line 4—4 of FIG. 3.
Figure 5:
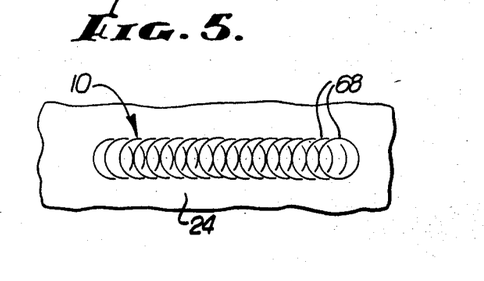
FIG. 5 is a detailed view of an overlapping seam weld taken on line 5—5 of FIG. 3.

The fabrication of the rim 14 may be accomplished by starting with flat stock, and through a series of conventional rolling steps, forming the stock to the approximate diameter, as well as to the desired cross-sectional configuration best seen in FIGS. 2 and 4. This cross-sectional configuration of the rim 14 includes an annular, generally flat in cross-section, center base portion 24 having exterior and interior surfaces 26 and 28, respectively. From each side of the base portion 24, the rim, in cross-section, extends outwardly and upwardly, terminating in annular tire retaining marginal wall portions 30.

Once the rim 14 has been formed, the ends (unnumbered) are joined together and butt-welded at 32. The weld is then trimmed on the inner and outer surfaces and the edges. An opening 34 may then be pierced in the rim to receive a tire or tube valve stem (not shown).

The spider or disc 16 is fabricated, preferably from flat stock, by being punch-pressed to the desired configuration.

There are generally two types of spiders used in creating a vehicle wheel. The first type is a solid spider which is circular around its entire circumference, and adapted to uninterruptedly contact the interior of the rim 14. The other type (illustrated) is known as an "arch opening or chain slot" spider. In such construction, the spider is circular in circumference, but a plurality of chord bends 36 are made, normal to the circumference, so that when assembled with the rim 12, openings 38 are formed therebetween The spider or disc 16 is formed with an annular flange 40 extending normal to the diametrical plane thereof. Additionally, the spider or disc 16 is provided with a plurality of lug bolt openings 42, and a central opening 44, to be seated on the spindle (not shown) of a brake drum and axle of a vehicle.

The cross-sectional configuration of the spider or disc 16, best seen in FIG. 2, may vary, depending on what type of vehicle the wheel is to be used on.

It is important to note that it is common practice in the industry, when forming spiders or discs, that the exterior diameter of the spider or disc flange is oversize from the interior diameter of a rim base 24 by approximately 0.050 inch, so that a tight press fit is assured between the two parts forming the wheel. With prior art fastening arrangements, such oversize was necessary to assure a tight press-fit to prevent failure of the prior art fastening means. In some cases the oversize needs to be increased to 0.1000 inch, depending on spider configurations.

With this amount of oversize, it was customary to knock the rim out of true circumferential roundness when the spider was pressed into place. Such distortion can decrease the safety of the wheel when rotating at an excessive r.p.m. on a vehicle.

However, in the present invention, because of the tested stability of vehicle wheels utilizing the new fastening means, the oversize diameter of the spider flange need be no more than 0.025 inch, that is, just enough to hold the parts together during the fastening operation. Of more importance is the fact that with less of an oversize, the press fitting of the spider or disc into the rim will not distort the true circumference of the rim, thus creating greater safety.

Once the spider or disc 16 has been press fitted within the rim 14, the permanent fastening means of the overlapping seam weld 10 is accomplished at preferably 90° intervals around the circumference of the wheel 12. If desired the fastening could be accomplished at 120° intervals around the circumference of the wheel by using a spider 16 having three spokes or flanges 40. A three spoked spider 16 would have the advantage of breaking up unwanted vibratory motion in an automobile wheel and rim caused by rotation. The fastening takes place between the interior surface 28 of the rim 14 and the flange 40 by a series of the overlapping seam welds 10.

In order to accomplish the weld, various methods may be employed; however, it is preferred that the multiple stage resistance seam welding apparatus 18 be utilized. Generally, the apparatus includes a mandrel means 50 to receive the opening 44 of the wheel 12. The mandrel means 50 is further provided with position pins 51 adapted to fit within and engage lug bolt openings 42 of the wheel 12. The pins 51 will aid in the rotation of the wheel 12 as the mandrel is incrementally rotated by the mechanism hereinafter described.

The multiple stages include a plurality of opposed electrode sets each of which are mounted on fixed members (not shown) by means of conventional self-balancing cylinder assemblies generally designated 53. The assemblies 53 include cylinder members 54, hydraulically or pneumatically operated, and pistons 56. Further, the assemblies include slidable yokes 58 which are spring held against movement until the electrode wheel carried by the piston 56 is advanced into welding position against the wheel rim 14.

Journalled on the pistons 56 are outer electrode wheels 60, and inner electrode wheels 62 are angularly mounted and journalled on yokes 58. The outer electrode wheels 60 are adapted to strike the outer surface 26 of the center base of the rim 14. The inner electrode wheels 62 are adapted to have their peripheral rim portions engage the flange 40 of the spider on its underside. The detailed construction of the inner and outer seam welder heads carrying the electrode wheels 60 and 62 is described hereinafter. It is noted that the inner electrode wheels 62 are mounted to have their planes intersect at an angle of less than 180° so that larger wheels may be used in the restricted space within the wheel rim 14.

In operation, when the wheel 12 is in position, the cylinder means are simultaneously activated by any suitable control means, such as described hereinafter in connection with FIG. 10, and the pistons 56 simultaneously advance the outer electrodes 60 against the rim 14. Once the rim 14 is engaged, the cylinder assemblies 53 due to the conventional self-balancing arrangement included therein will reverse, moving away from the wheel 12, and causing yokes 58 and inner electrode wheels 62 to simultaneously move out and engage the flange 40. In other words, the cylinder assemblies are self-compensating.

Additionally, a water source 63 may be provided whereby water will be pumped through hose 64, to flood the rim during welding operations and reduce the heat of the rim.

It is also preferred that the annular contact surface of the electrodes 60 and 62 be bowed outwardly in cross section to achieve a concentrated point contact with the rim and flange. Such construction also achieves a dissipation of heat from the contact point, which further assures a reduced disruption of the parent metal.

When a weld is desired to be made, the piston assemblies 53 are each actuated under considerable high pressure, and electrodes 60 and 62 are simultaneously forced against the surface 26, pressing the flange 40 and the base 24 together. At this point, the electrode wheels 60 and 62 are energized by suitable means, and the resistance therebetween will fuse the parent metal of the rim 14 and flange 40 together, forming a circular single weld nugget 68 of approximately one-half inch in diameter.

The electrodes are de-energized, and the mandrel 50 will be rotated to rotate the wheel 12 approximately one quarter inch, where the welding process is repeated and a second weld nugget 68 is formed, partially overlapping the first weld nugget 68. This process is repeated until the desired length of overlapping weld nuggets 68, creating the finished overlapping seam weld 10, is formed. In actual practice, it has been found that a seam weld of approximately 2½ inches, at 90° intervals, forms a sufficient fastening means.

When utilizing a process of seam welding with the apparatus just described, it has been found that for each weld nugget 68, only two pulses of heat are necessary to accomplish the proper fusion of parent metal, as opposed to seven pulses of heat necessary when using the conventional single spot welding technique.

It is necessary to apply only two pulses of heat because less area has to be welded at one time by the overlapping seam weld than in a spot weld. Therefore, the concentration of heat can be reduced. While there are more actual welds in the overlapping seam weld, each weld is smaller in width and length than a spot weld for vehicle wheels, thus less heat is necessary. Therefore, with less applied heat and a smaller area of each seam weld, the molecular structure of the parent metal surrounding the weld is not changed and metal fatigue is avoided. This end result is further possible because the actual touching part of the bowed electrode is relatively small, further assuring that heat will dissipate to the atmosphere and not upset the surrounding metal.

By way of establishing the strength and safety of the vehicle wheel 12 when the rim 14 and spider 16 are fastened by the overlapping seam weld, testing has been carried out on a "bull wheel tester."

The test procedure includes the random selection of a completed wheel 12 and fitting it with a tire. The wheel and tire are then mounted for rotation on a roller, and a powered roller or "bull wheel" engages the tire and rotates the tire and wheel at a speed of approximately 52 miles per hour, or approximately 600 r.p.m.

In tests of the new wheel 12, selected at random, the wheel has undergone testing up to 4,000,000 revolutions at its design test load without any failure of the wheel 12 in the area of the fastening means which hold the rim and spider together. On the other hand, when prior art spot-welded, or riveted vehicle wheels of the same design test load were tested on the same tester, failures by way of cracks in the parent material surrounding the securement means developed at 2,000,000 revolutions or less.

Thus, it can be seen that under actual testing conditions, the new vehicle wheel 12 exceeded the failure point of prior art wheels by double the number of revolutions, and did not fail even at this point in the testing.

Therefore, the overlapping seam weld, or fastening means, provides a safer and more effective vehicle wheel than heretofore possible. Further, the method and apparatus utilized in so forming the fastening means, is new and novel, which not only assures greater safety of the wheel by less disturbance of the parent metal while welding, but has the capability of forming the desired four fastening means simultaneously.

Figure 8:
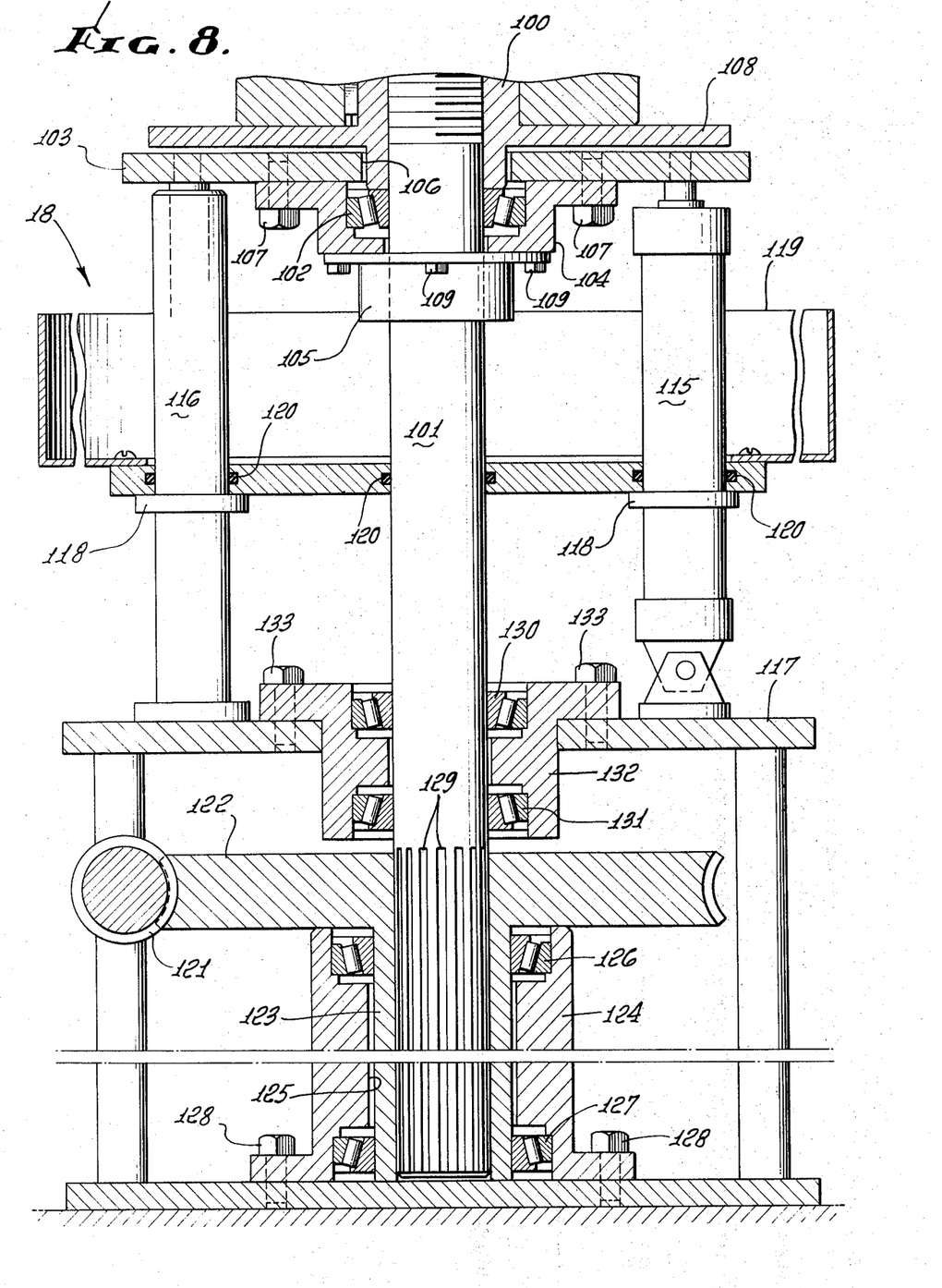
FIG. 8 is a side elevation view in section of the lower portion of the welding apparatus of FIG. 2 shown in its lowered position.
Figure 9:
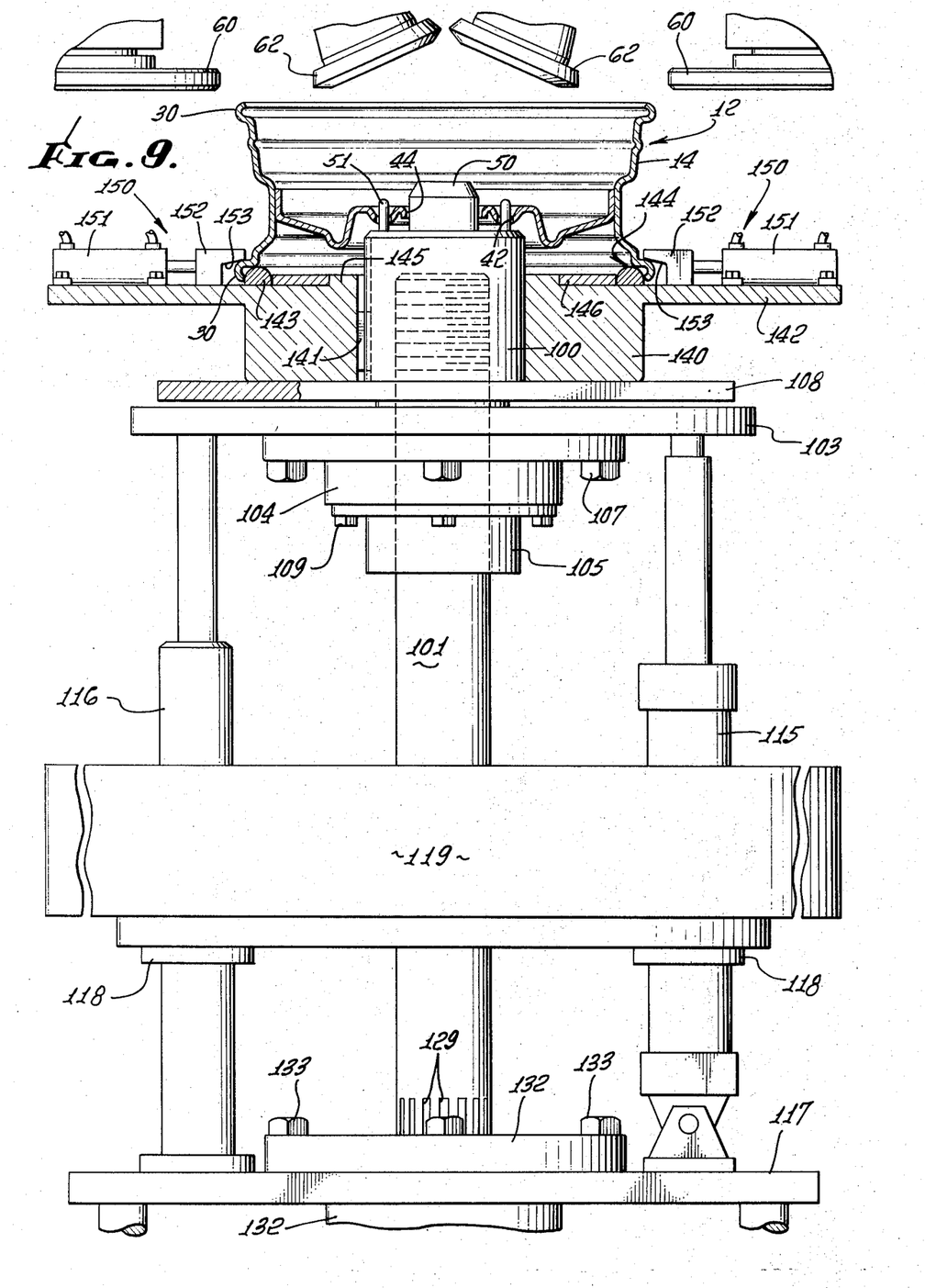
FIG. 9 is a side elevation view of the welding apparatus of FIG. 2 illustrating it being raised from the lowered position of FIG. 8 to the raised elevated welding position of FIG. 2 and showing a wheel rim with a spider inserted therein clamped thereon.

Referring to FIGS. 8-9, the mandrel 50 and position pins 51 are formed on a collar member 100. The collar 100 is fixedly secured upon the upper end of a preferably vertical extending drive shaft 101, preferably by being screwed thereon. The lower edge of the collar 100 rests upon a thrust bearing 102 which is fitted around the drive shaft 101.

The thrust bearing 102 is held in an elevated position by a horizontally supported plate member 103, an annular member 104 which defines a seat for the bearing 102 and a collar-like seal means 105. The plate 103 has an opening 106 centrally formed therein through which the lower end of the collar 100 extends. The bearing seat 104 is bolted to the underside of the plate 103 by bolts 107 and holds the thrust bearing 102 in a horizontal position whereat it supports the collar 100, holding a radially extending plate portion 108 of the collar 100 in a spaced position above the plate 103, out of contact therewith, and parallel thereto. The seal 105 is bolted on the underside of the bearing seat 104 by bolts 109 and operates to form a seal around the drive shaft 101 to prevent dirt and other foreign matter from getting in the thrust bearing 102.

The plate member 103 is supported by a pair of hydraulically actuatable lift cylinders 115 and a pair of extendable guide rods 116, one of which of each is shown in FIGS. 8 and 9. The upper ends of the cylinders 115 and guide rods 116 are connected to the underside of the plate member 103 while their lower ends are mounted on the lower stationary frame 117 of the welding apparatus 18. The fixed portions of the cylinders 115 and guide rods 116 have flanges 118 formed thereon which support a water basin 119 for collecting water sprayed during the welding process by the water source 63. Seals 120 are positioned in the openings formed in the basin 119 through which the drive shaft 101, the cylinders 115 and the guide rods 116 vertically extend.

Mounted within the frame 117 is mechanism for rotating the drive shaft 101. The mechanism includes a worm gear 121 which engages and drives a horizontally extending gear wheel 122. The gear wheel 122 is centrally supported in its horizontal extending position by a collar 123 formed thereon to extend downwardly and mounting structure 124. The structure 124 has a vertically extending cylindrical channel 125 therein dimensioned to receive the gear collar 123 and thrust bearings 126 and 127 are mounted at the upper and lower ends, respectively, of the channel 125 to rotatably mount the collar 123 in the structure 124. The structure 124 is secured by bolts 128 to the bottom of the frame 117.

Spines 129 are formed on the lower end of the drive shaft 101 which engage vertically extending spine receiving grooves formed in the central opening of the gear wheel 122 and its collar 123. The gear 122 when driven by the worm gear 121 rotates the drive shaft 101 and the spines 129 on the shaft ensure engagement of the shaft 101 with the gear wheel 122 even when the shaft 101 has been raised by actuation of the lift cylinders 115 to the elevated welding position shown in FIG. 2. The worm 121 is driven incrementally by a conventional hydraulic motor as hereinafter described in connection with FIG. 10.

Thrust bearings 130 and 131 are also held by mounting structure 132 around the shaft 101 just above the gear 122. The structure 132 seating the thrust bearings 130–131 is secured by bolts 133 in a central opening formed in the top of the apparatus frame 117.

As shown in FIGS. 2 and 9, a disc shaped member 140 having a central opening therein sized to receive the collar 100 is fitted around the collar 100. The disc 140 rests upon the upper planar surface of the radially extending plate 108 formed on the collar 100 and is keyed by key 141 to the collar 100. Thereby, the disc 140, collar 100 and drive shaft 101 rotate together whenever the shaft 101 is driven.

A radially extending plate portion 142 is formed as part of the disc 140 to provide an area for supporting rim clamping mechanisms. The plate 142 forms a continuation of the horizontally extending upper surface of the disc 140. Concentrically mounted with respect to the shaft 101 on the upper surface of the disc 140 is an annular boss structure 143. The annular boss 143 has a diameter substantially equal to the diametrical distance circumscribed by the tire retaining rim 30 on the wheel rim 14. The boss 143 lies in a substantially horizontal plane and supports the wheel 12 by engaging the rim 14 at point 144 just inside the retaining rim 30. The height of the boss 143 is appropriately dimensioned so that the boss 143 by supporting the wheel 12 operates to hold the retaining rim 30 above the disc 140 out of contact therewith and the spider 16 above the upper end of the collar 100 out of contact therewith. It is noted that the annular boss 143 is preferably removable so that different diameter members may be used for different diameter wheels to be welded and that a collar portion 145 and an annular spacing member 146 may be used for holding the boss member 143 concentric with the shaft 101 and mandrel 50.

As abovementioned the planar surface 142 of the disc 140 provides structure upon which wheel clamping mechanisms may be mounted. Two clamping mechanisms 150 are shown in FIGS. 2 and 9, each made up of a pneumatic cylinder 151 connected to advance or retract a slidable rim clamp 152. The clamp 152 is slidably mounted in a groove not shown in the plate 142 and selective actuation of the cylinder 151 forces the sloped clamp portion 153 over the tire retaining rim 30 of the wheel 12 to firmly clamp the wheel 12 on the annular boss 143.

Figures 6, 7:
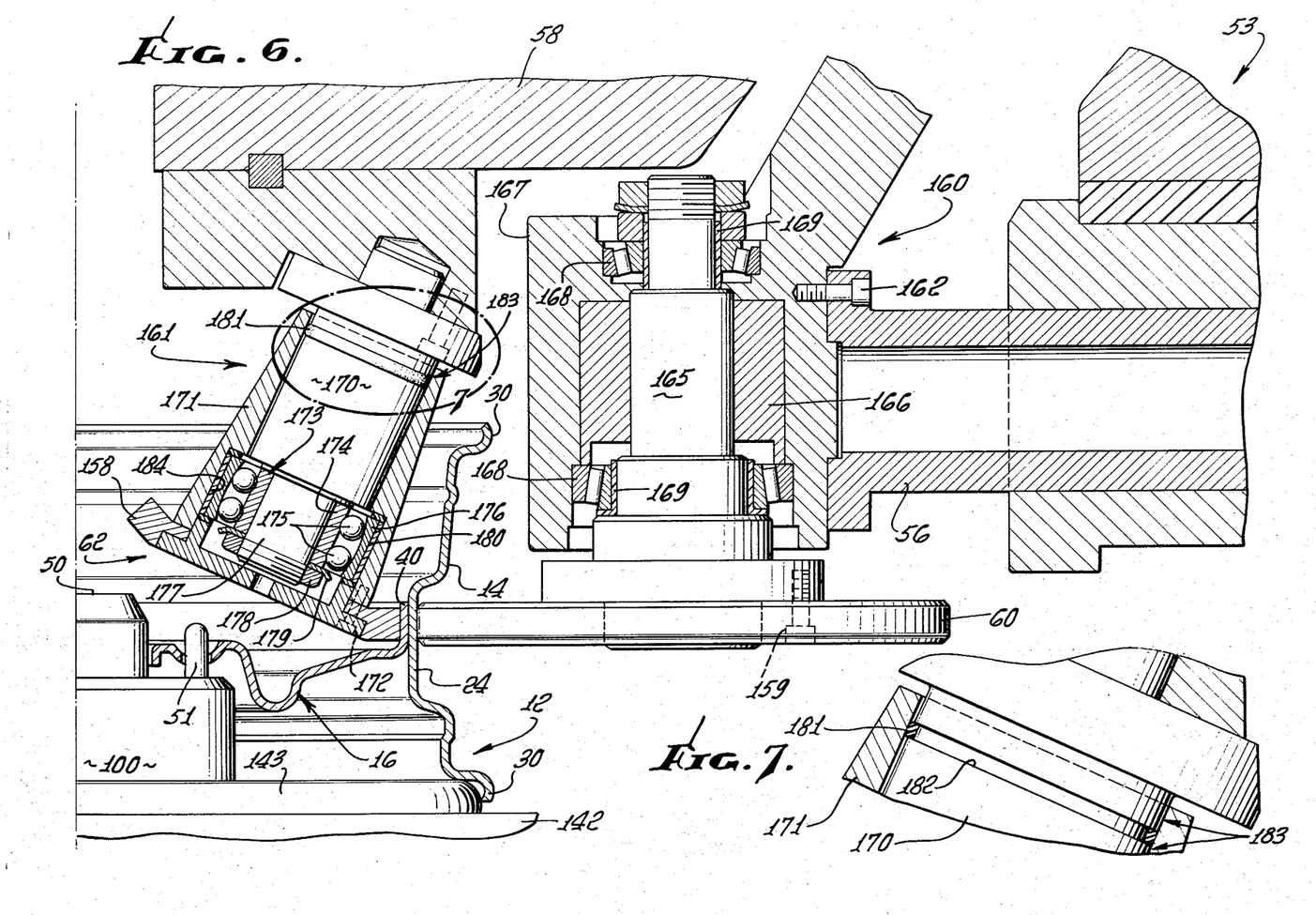
FIG. 6 is a side elevation view partially in section of one electrode set of the electrical resistance welding apparatus according to the present invention, the upper portion of which is shown in FIG. 2 fastening a spider to an annular wheel rim.
FIG. 7 is a view on enlarged scale of the portion of the inner seam welder head enclosed by a dashed circle in FIG. 6.

Referring to FIG. 6, one set of the plurality of opposed electrodes in the welding apparatus 18 is there shown in detail. Each set of opposed electrodes includes an outer welder head 160 and inner welder head 161. The outer welder head 160 is bolted by bolt 162 to the piston 56 of the hydraulic cylinder assembly 53 and the inner welder head 161 is mounted on the slidable yoke 58 of the hydraulic cylinder assembly 53.

The outer seam welder head 160 is conventional in design and includes an electrically conductive shaft portion 165 which has the outer electrode wheel 60 mounted on its lower end by bolt 159. The shaft 165 extends substantially vertically through an electrically conductive cylindrical inner housing 166 which is mounted in an outer housing 167. The shaft 165 is rotatably mounted by thrust bearings 168 to extend through the inner housing 166 and the conductive shaft 165 is free to rotate relative to the cylindrical conductive body 166. Insulation 169 is provided for insulating the shaft 165 from the thrust bearings 168 to prevent burning up of the bearings. The wheel electrode 60 extends substantially normally to the axis of the shaft 165.

In operation of the outer welder head 160, current flows from one terminal of a power source through inner housing 166, the shaft 165 and the electrode wheel 60 through the wheel rim 14 and spider 16 to the inner welder head 161. It is noted that in constructing the outer welder head 160 that the electrode wheel 60 may be made sufficiently large so that the current density therein and between the rotatable shaft 165 and inner housing 166 is low enough as to not cause arcing therebetween.

The inner seam welder head 161 is of a novel and improved design and includes a stationary electrical conductive shaft 170, preferably made of copper, which is fixedly mounted on the yoke structure 58. The shaft 170 preferably extends at an incline to the vertical downward away from the outer welder head 160. The angle between the axis of the shaft 170 and the vertical may for example be 25°. The shaft 170 is preferably cylindrical.

Fitted over the shaft 170 is an electrically conductive sleeve 171 which is preferably cylindrical and made of copper. The inner diameter of the sleeve 171 may, for example, be 2.500 inches when the outer diameter of the shaft 170 is 2.496 inches. Mounted on the lower end of the sleeve 171 is the inner electrode wheel 62 by means of a bolt 172. The outer peripheral rim or edge portion 158 of the electrode wheel 62 preferably extends at approximately a 65° angle with respect to the axis of the sleeve 171 so that it bears normally against the flange 40 on the spider 16 during welding. The purpose of mounting the inner wheel electrodes 62 with their planes at angles other than normal to the vertical is to enable the wheel electrodes 62 to be made larger. As shown in phantom lines in FIG. 2, the electrode wheels 62 nevertheless almost touch when in their retracted positions due to the limited space within the annular rim 14.

The sleeve 171 is rotatably and tiltably mounted on the shaft 170 by means of an insulated double roll ball spherical type bearing 173. It is noted that outer diameter of the shaft 170 and the inner diameter of the sleeve 171 are made, respectively, smaller and larger at their lower ends to accommodate and define a bearing seat for the spherical bearing 173. The bearing 173 is located along the longitudinal dimension of the sleeve 171 at a point longitudinally offset from the electrode wheel 62 so that pressure on the electrode wheel 62 tilts the sleeve 171 against the shaft 170.

The bearing means 173 includes an inner race 174, two rows of balls 175 and an inwardly curved spherical outer race 176. The inner race 174 is collar shaped and fits around the reduced diameter cylindrical extension 177 on the lower end of the shaft 170. The outer race 176 is fitted in a circumferential recess or groove 184 in the sleeve 171. The extension 177 has threads formed on its lower portion upon which a nut 178 is threaded to hold the race 174 in place. A washer 179 is positioned around the extension 177 between the race 174 and the nut 178. Insulation 180 is also placed between the outer collar-like spherical race 176 and the sleeve 171. Thereby, the bearing means 173 is electrically insulated from the sleeve 171 and electrode wheel 62 to prevent conduction therethrough and burning up of the bearing 173. An O-ring type seal 181 is fitted in a circumferential groove 182 in the upper portion of the shaft 170 to prevent dirt and other foreign matter from getting between the shaft 170 and the sleeve 171 and into the bearing 173.

In operation of the inner welder head 161, electrical current passing through the spider flange 40 and the rim 14 to or from the outer welder head 160 is conducted through the inner electrode wheel 62, the sleeve 171 and the shaft 170 from or to the other terminal of the power source driving the welder heads.

As beforementioned, the smaller size of the inner electrode wheel 62 with respect to the outer electrode wheel 60 causes higher current densities therein. These higher current densities tend to cause arcing between the conductive shaft 170 and sleeve 171. The improved welder head 161 solves this problem by tiltably mounting the sleeve 171 on the shaft 170. As a result, weld pressure on the electrode wheel 62 tilts or pivots the sleeve 171 tightly against the shaft 170 in the region 183, as shown clearly in FIG. 7, to establish and maintain firm physical and good electrical contact therebetween. This electrical contact between the sleeve 171 and shaft 170 is maintained as long as there is weld pressure even when the sleeve 171 rotates relative to the shaft 170 and is sufficient to conduct the high density currents in the wheel electrode 62. Further, as the shaft 170 and sleeve 171 wear with use, the physical and electrical contact therebetween improves.

Figure 10:
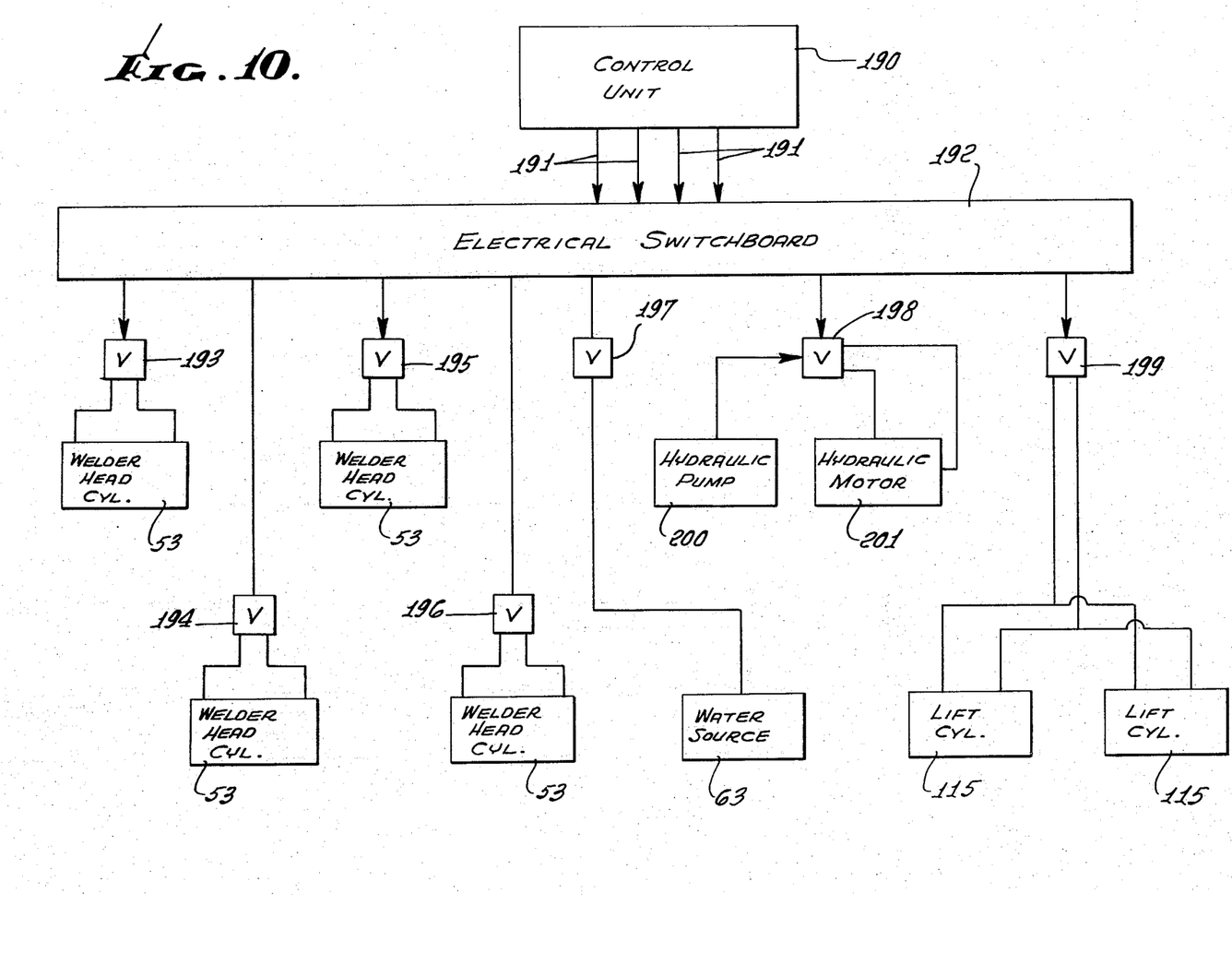
FIG. 10 is a block diagram of a control system for programming the operation of the welding apparatus according to the present invention.

Referring to FIG. 10, a block diagram of a control system for programming the operation of the welding apparatus 18 is illustrated. A conventional electronic control unit is shown generally designated by the numeral 190 which is operable to generate sequential control signals on lines 191 for energizing relays in the electrical switchboard 192. Energization of selected relays in the switchboard 192 controls the operation of each of the solenoid valves 193-199.

The solenoid valves 193-196 each controls the flow of hydraulic fluid to one of the welder head cylinder assemblies 53. Simultaneous actuation of the valves 193-196 to one position causes the welder heads 160-161 to be extended into the welding position shown in solid lines in FIG. 2 while simultaneous actuation of the valves 193-196 to their other position moves the welding heads apart to the separated position shown in FIG. 9.

Figure 1:
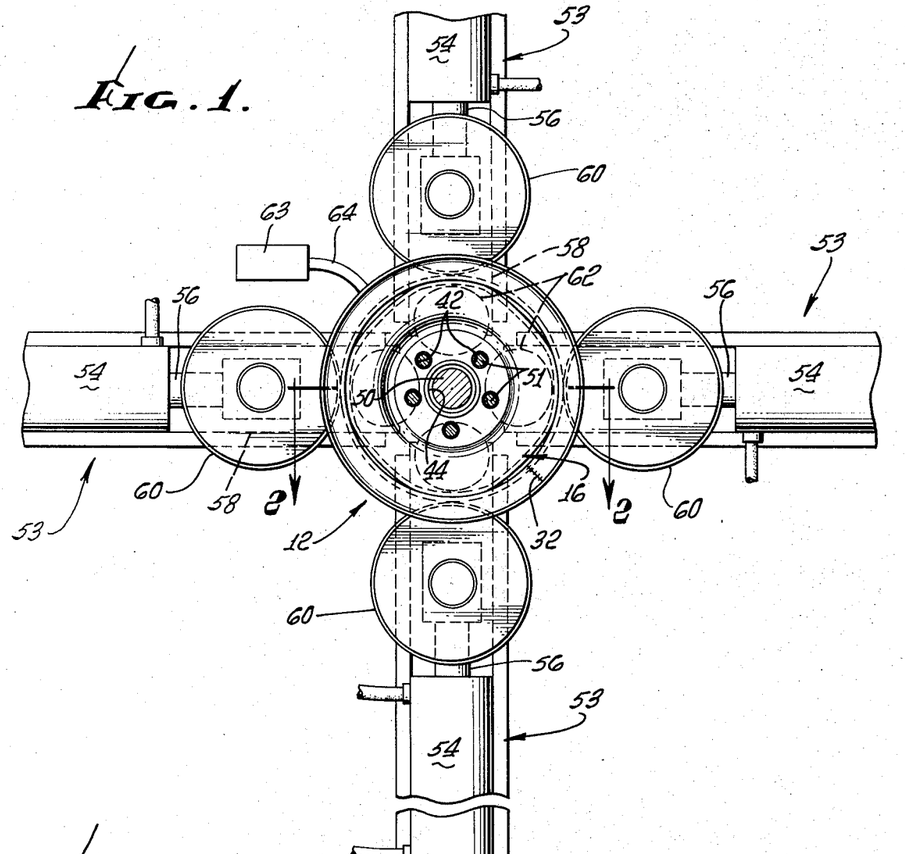
FIG. 1 is a top view schematic representation of the improved multiple stage resistance seam welder with a vehicle wheel positioned thereon being assembled with the new fastening technique.

The solenoid valve 197 controls the operation of the water source 63 shown in FIG. 1. In one position, the valve 197 causes water to be pumped onto a wheel 12 being welded. In its other position, the valve 197 causes the flow of water out the water source hose 64 to stop.

Switching of valve 198 causes hydraulic fluid to be directed from the constantly running hydraulic pump 200 to one or the other side of a hydraulic motor 201. Thereby, the hydraulic motor 201 may be driven in either direction and driven during brief time intervals to incrementally rotate the drive shaft 101 so that by controlling the application of power to the welder heads 160-161 the overlapping weld nuggets 68 may be formed. The hydraulic motor 201 is connected in a conventional manner to drive the worm gear 121 which in turn rotates the gear wheel 122 and the drive shaft 101. It is noted that control unit 190 is also preferably employed and operable to generate the control signals which control the timed application of power to the welder heads 160-161 to generate the weld pulses.

The operation of the hydraulic lift cylinders 115 which move the welding apparatus 18 from its lowered loading and unloading position shown in FIG. 8 through the position shown in FIG. 9 to the raised welding position of FIG. 2 is controlled by the solenoid valve 199. In one position, the valve 199 causes the lift cylinders 115 to be extended while in its other position the cylinders 115 are retracted.

The welder apparatus 18 is generally operated in the following manner. A wheel 12 having a spider 16 force fitted in an annular rim 14 is loaded in the welding apparatus in its lowered position by setting the rim part 144 on the boss 143 with the positioning pins 51 extending through lug bolt openings 42 and the mandrel 50 extending through the central spider opening 44. The rim clamping mechanisms 150 are next set to clamp the wheel rim 14 on the annular boss 143.

The hydraulic cylinders 115 are extended to raise the wheel 12 to welding position. Once the wheel 12 is in raised position, the cylinder assemblies 53 are actuated to advance the inner and outer wheel electrodes 60 and 62 against the spider flange 40 and rim portion 24, respectively. Next the weld pulses are periodically applied to the welder heads 160 and 161 while incrementally rotating the drive shaft 101 in a timed sequence, as beforedescribed, to simultaneously form the circumferentially spaced seam welds 10 made up of the overlapping weld nuggets 68. The wheel 12 with the spider 16 welded in place to the rim 14 is lowered, after the welder heads have been moved apart, by retracting the lift cylinders 115 and then unloaded. The welding apparatus 18 is now ready to weld another wheel 12.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent structures, devices and methods.

I claim:

1. An electrical resistance welding apparatus, comprising:

at least one opposed electrode set including first and second opposed welder heads of the wheel electrode type;

at least said first welder head including an electrically conductive stationary shaft, an electrically conductive sleeve dimensioned to fit around said shaft, an electrode wheel mounted on said sleeve at a selected point along its longitudinal axis in electrical contact with said sleeve, and electrically insulative mounting means tiltably and rotatably mounting said sleeve around said shaft at a point along the longitudinal axis of said sleeve longitudinally offset from the position of said electrode wheel whereby whenever weld pressure is applied to said electrode wheel said sleeve is tilted against said shaft to make electrical contact therewith; and means for advancing said opposed welder heads against a workpiece positioned therebetween to create a weld pressure and for selectively applying power to said welder heads when advanced against a workpiece to generate weld pulses.

2. The invention recited in claim 1, wherein said mounting means includes a spherical bearing means positioned between said shaft and said sleeve.

3. The invention recited in claim 2, wherein said mounting means includes insulation positioned between said spherical bearing means and said sleeve.

4. The invention recited in claim 1, including a plurality of said opposed electrode sets connected for simultaneous actuation and positioned for engaging an annular workpiece and wherein said first and second welder heads of each set of said opposed electrodes are positioned to engage, respectively, the inner and outer peripheral surfaces of the annular workpiece.

5. The invention recited in claim 4, including means for incrementally advancing an annular workpiece engaged by said plurality of electrode sets and controlling the generation of weld pulses to form a seam weld on said workpiece made up of a series of overlapping weld nuggets.

6. The invention recited in claim 4, wherein the planes defined by said electrode wheels of said first welder heads intersect at an angle of less than 180°.

7. A welder head, comprising:
an electrically conductive shaft;
an electrically conductive sleeve dimensioned to fit around said shaft;
an electrode wheel mounted on said sleeve at a selected point along its longitudinal axis in electrical contact with said sleeve; and
electrically insulative mounting means tiltably and rotatably mounting said sleeve around said shaft at a point along the longitudinal axis of said sleeve longitudinally offset from the position of said electrode wheel whereby whenever said shaft is held stationary and weld pressure is applied to said electrode wheel said sleeve is tilted against said shaft to make electrical contact therewith.

8. The invention recited in claim 7, wherein said mounting means includes a spherical bearing means positioned between said shaft and said sleeve.

9. The invention recited in claim 8, wherein said mounting means includes insulation positioned between said spherical bearing means and said sleeve.

10. A welder head, comprising:
an electrically conductive cylindrical shaft;
an electrically conductive cylindrical sleeve dimensioned to fit around said shaft;
an electrode wheel mounted on one end of said sleeve; and
electrically insulative mounting means tiltably and rotatably mounting said sleeve around said shaft with said electrode wheel held out of contact with said shaft at a point along the longitudinal axis of said sleeve longitudinally offset from said sleeve end whereat said electrode wheel is mounted whereby whenever said shaft is held stationary and weld pressure is applied to said electrode wheel said sleeve is tilted against said shaft to make electrical contact therewith.

11. The invention recited in claim 10, wherein said mounting means includes a spherical bearing means positioned between said shaft and sleeve.

12. The invention recited in claim 11, wherein said spherical bearing means includes an inner bearing race, an outer inwardly curved spherical bearing race positioned around said inner bearing race and at least one row of ball bearings held between said inner and outer bearing races, said inner and outer bearing races mounted, respectively, on said shaft and said sleeve.

13. The invention recited in claim 12, wherein said mounting means includes insulation positioned between said spherical bearing means and said sleeve.

14. The invention recited in claim 13, wherein said wheel electrode has a peripheral rim portion which contacts the workpiece to be welded, said peripheral rim portion being formed to extend at an angle other than normal to the axis of said sleeve.

* * * * *